United States Patent [19]

Tanaka et al.

[11] 4,428,232
[45] Jan. 31, 1984

[54] CAPACITANCE LIQUID LEVEL DETECTOR

[75] Inventors: Hiroaki Tanaka; Shigeyuki Akita, both of Okazaki, Japan

[73] Assignee: Nippon Soken, Inc., Nishio, Japan

[21] Appl. No.: 320,567

[22] Filed: Nov. 12, 1981

[30] Foreign Application Priority Data

Nov. 20, 1980 [JP] Japan .......................... 55-167133[U]

[51] Int. Cl.³ ........................ G01F 23/26; H05K 1/18
[52] U.S. Cl. .................................. 73/304 C; 331/65; 361/395
[58] Field of Search ............... 73/304 C; 361/284, 395

[56] References Cited

U.S. PATENT DOCUMENTS

| | | | |
|---|---|---|---|
| 2,703,857 | 3/1955 | Engelhardt et al. | 324/61 P |
| 2,752,543 | 6/1956 | Smith | 361/284 |
| 2,817,234 | 12/1957 | Campbell | 324/61 P X |
| 2,830,945 | 4/1958 | Keidel | 324/61 P X |
| 2,950,426 | 8/1960 | Frome | 73/304 C X |
| 3,050,999 | 8/1962 | Edwards | 73/304 C |
| 3,140,608 | 7/1964 | Clark | 73/304 C |
| 3,958,159 | 5/1976 | Rauchwerger | 73/304 C |
| 4,204,427 | 5/1980 | Gothe et al. | 73/304 C |

*Primary Examiner*—Daniel M. Yasich
*Attorney, Agent, or Firm*—Cushman, Darby & Cushman

[57] ABSTRACT

An electric liquid level detector for detecting the remaining quantity of liquid stored within a liquid container, comprising a pair of helically coiled electrodes extending vertically in the container and being fixed at their one ends to the upper portion of the container and at their other ends to the bottom of the container, the electrodes being submerged into the liquid stored within the container; and an oscillator circuit of the resistance capacity type including a variable condenser which consists of the electrodes, the oscillator circuit being arranged to oscillate at a frequency in dependence upon variation of the electrostatic capacitance between the electrodes so as to indicate the level of the stored liquid.

4 Claims, 3 Drawing Figures

CAPACITANCE LIQUID LEVEL DETECTOR

BACKGROUND OF THE INVENTION

The present invention relates to a liquid level detector, and more particularly to an electric liquid level detector of the condenser type for detecting the remaining quantity of liquid stored within a liquid container or tank as accurately as possible.

In a conventional electric liquid level detector of this kind, a float is disposed within a liquid container for vertical movement in response to the variation of the level of liquid stored within the container. The float is provided thereon with a fixed contact which is movable on a resistance element in response to vertical movement of the float to detect the remaining quantity of the stored liquid in dependence upon variation of the resistance value between the fixed contact and one end of the resistance element. In such an electric liquid level detector, relatively large buoyance is required to ensure smooth movement of the fixed contact on the resistance element. This results in difficulty of application of a small size float in the detector. Furthermore, defacement of the two contact elements causes unexpected error in operation of the detector, and also accurate detection of the liquid level may not be expected due to deviation of the detected resistance value caused by difference in contact area between the two contact elements.

In another type of conventional electric liquid level detector, detected is variation of the electro-static capacitance between electrodes submerged into the liquid stored within a container. For the purpose of detecting the level of the stored liquid as accurately as possible, it is required to increase the electro-static capacitance between the electrodes so as to enhance the rate of change of the electro-static capacitance in accordance with variation of the liquid level.

SUMMARY OF THE INVENTION

It is, therefore, the primary object of the present invention to provide an electric liquid level detector in which a pair of helically coiled electrodes are submerged into the liquid stored within a container to increase the electro-static capacitance between the electrodes in a small space and in which an oscillator circuit of the resistance capacity type is arranged to indicate the level of the stored liquid in dependence upon variation of the electro-static capacitance between the electrodes.

Another object of the present invention is to provide an electric liquid level detector, having the above-mentioned characteristic, capable of adjusting the electro-static capacitance between the electrodes in accordance with capacity or shape of the container for accurate detection of the liquid level.

According to the present invention there is provided an electric liquid level detector for detecting the remaining quantity of liquid stored within a liquid container, which comprises a pair of helically coiled electrodes extending vertically in the container and being fixed at their one ends to the upper portion of the container and at their other ends to the bottom of the container, the electrodes being submerged into the liquid stored within the container, and an oscillator circuit of the resistance capacity type including a variable condenser which consists of the electrodes, the oscillator circuit being arranged to oscillate at a frequency in dependence upon variation of the electro-static capacitance between the electrodes so as to indicate the level of the stored liquid.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
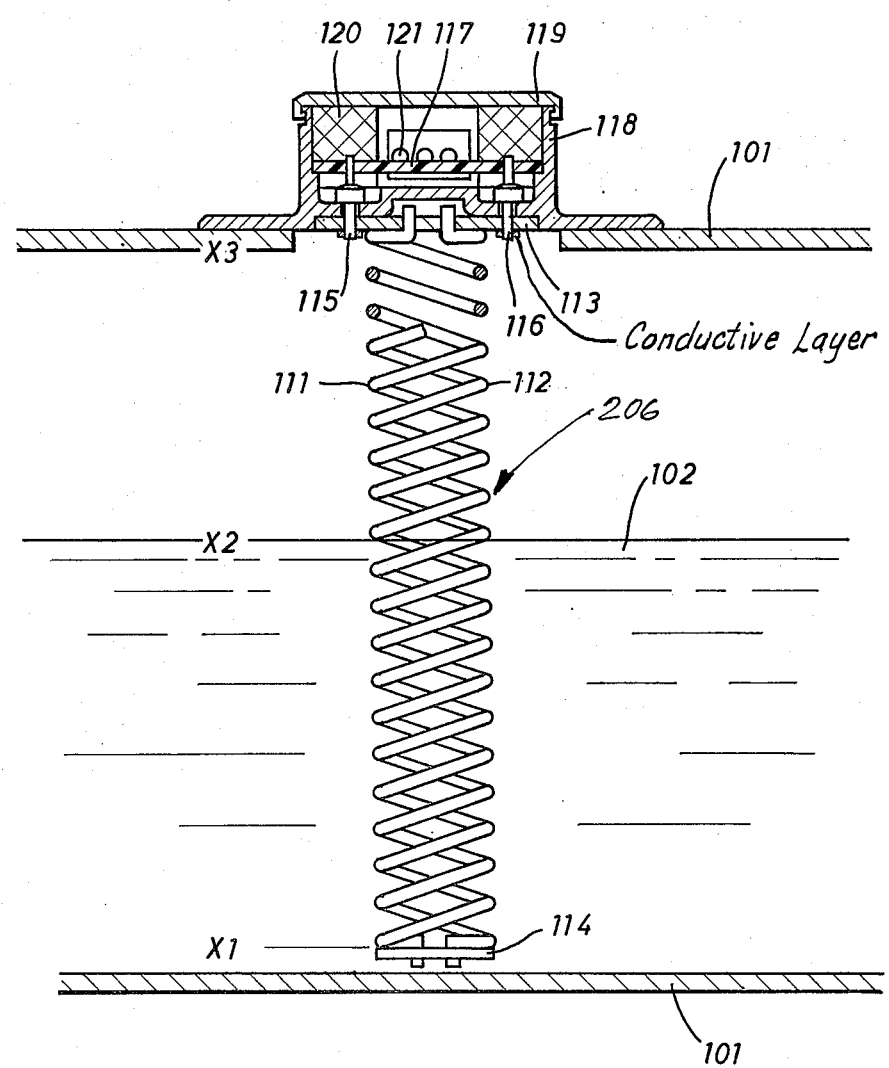
FIG. 1 is a sectional view illustrating an electric liquid level detector in accordance with the present invention.

With reference to the drawings, FIG. 1 illustrates an embodiment of an electric liquid level detector in accordance with the present invention in which a liquid container 101 stores therein an amount of insulating liquid 102, and a pair of helically coiled electrodes 111, 112 are vertically submerged into the stored liquid to detect the remaining quantity of liquid in the container 101. The electrodes 111, 112 are arranged to be appropriately adjusted in respective spaces therebetween, and the electro-static capacitance between the electrodes 111, 112 changes in accordance with the remaining quantity of liquid in the container 101. A conductive wire such as an enamelled copper wire is used as the material of the electrodes 111, 112, of which the diameter is determined in an appropriate dimension to prevent undesired vibration of the electrodes 111, 112 caused by swing of the stored liquid and to prevent deformation caused by its weight.

The electrodes 111, 112 are fixed at their one ends to an upper insulation support plate 113 and at their other ends to a lower insulation support plate 114, the former plate 113 being secured to the bottom of a cylindrical housing 118 which is mounted in a fluid-tight manner on the container 101, and the latter plate 114 being fixedly positioned at the bottom of container 101. A pair of connecting terminals 115, 116 are electrically connected in a usual manner at their one ends to the upper ends of electrodes 111, 112 through a conductive layer deposited on the bottom surface of support plate 113 and at their other ends to a printed insulation plate 117 which supports thereon a curcuit assembly in the form of an oscillator circuit of the resistance capacity type shown in FIG. 2. The respective connecting terminals 115, 116 are sealed to prevent the entry of the stored liquid into the interior of housing 118, and the housing 118 is provided with a cover 119 coupled thereover and openings 121 for leading the wires therethrough from the circuit assembly outwardly.

Figure 2:
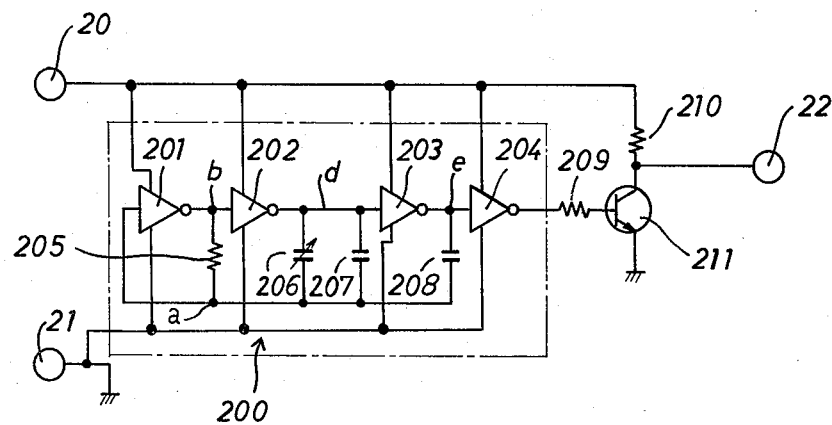
FIG. 2 is a circuit diagram of an oscillator circuit adapted to the electric liquid level detector shown in FIG. 1.

In FIG. 2, the oscillator circuit 200 is connected at 20 to an electric DC power source and grounded at 21. The oscillator circuit 200 comprises a first inverter 201, a resistor 205 connected in series with the first inverter 201 to form a closed circuit, a second inverter 202 connected at its input terminal to an output terminal of the first inverter 201, a variable condenser 206 connected at one end thereof with an output terminal of the second inverter 202 and at the other end thereof with the output terminal of the first inverter 201 through the resistor 205, a condenser 207 connected in parallel with the variable condenser 206, a third inverter 203 connected at its input terminal to the output terminal of the second inverter 202, and a condenser 208 connected at one end thereof with an output terminal of the third inverter 203 and at the other end thereof with the output terminal of the second inverter 202 through the condensers 206, 207. The oscillator circuit 200 further includes a fourth inverter 204 connected at its input terminal with the output terminal of the third inverter 203, and a transistor 211 connected at its base to the output terminal of the fourth inverter 204 through a resistor 209. The transistor 211 is connected at its collector with a resistor 210 and an output terminal 22 and grounded at its emitter.

Figure 3:
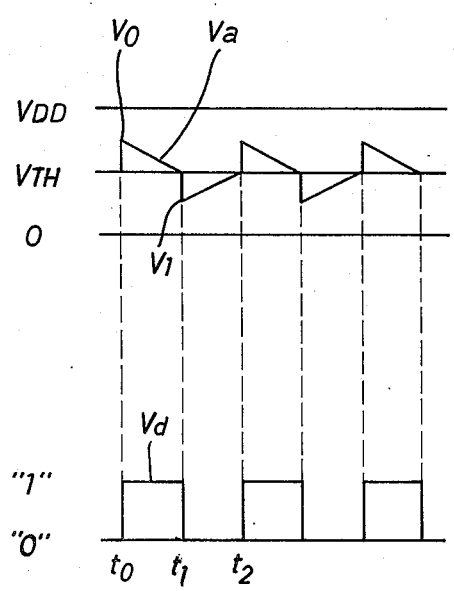
FIG. 3 is a graph illustrating characteristic curves of oscillating frequency in the oscillator circuit of FIG. 2.

In the above oscillator circuit 200, the variable condenser 206 consists of the helically coiled electrodes 111, 112 of which the electro-static capacitance will change in accordance with the remaining quantity of liquid stored in the container 101, as described above. In the following description, the condensers 206 and 207 are simply called a first condenser C, and the condenser 208 is called a second condenser. In this embodiment, a threshold or transfer voltage of the inverters 201-204 is determined as a predetermined voltage $V_{TH}$ between the DC voltage $V_{DD}$ and zero voltage, as shown in FIG. 3.

Assuming that in operation the level of the stored liquid drops from its maximum value $X_3$ to its minimum value $X_1$ through a medium value $X_2$, the electro-static capacitance of the variable condenser 206 will decrease from its maximum value $C_3$ to its minimum value $C_1$ through a medium value $C_2$. This means that the electro-static capacitance at the output terminal of the second inverter 202 changes in accordance with the sum of the electro-static capacitance $C_0$ of condenser 207 and each electro-static capacitance $C_3$, $C_2$, or $C_1$ of condenser 206. In this embodiment, the electro-static capacitance $C_4$ of the second condenser 208 is determined to be substantially equal to the sum of the electro-static capacitances $C_0$ and $C_2$.

When the liquid level is in its maximum value $X_3$, the electro-static capacitance of the first condenser C is larger than the capacitance $C_4$ of the second condenser 208 because of $C_3 > C_2$. Assuming that at time $t = t_0$, an output voltage $V_d$ of the second inverter 202 is at a high level, and an output voltage $V_e$ of the third inverter 203 is at a low level, the first and second condensers C and 208 are biased opposite to each other due to output and input voltages of the third inverter 203. As a result, a voltage $V_a$ appearing at a terminal a of the first condenser C is partly offset by the voltage of the second condenser 208 to be in a value $V_0$ lower than DC voltage $V_{DD}$ and higher than the threshold voltage $V_{TH}$. Then, a differential current flows through the oscillator circuit with a time period defined by the first and second condensers C and 208 and the resistor 205, and subsequently the voltage $V_a$ of the first condenser C drops the threshold voltage $V_{TH}$ at time $t = t_1$. At this stage, the output voltage $V_d$ of the second inverter 202 is maintained at the high level.

When the voltage $V_a$ drops the threshold voltage $V_{TH}$ with lapse of time from $t_0$ to $t_1$, the first inverter 201 is inverted to render the low level output voltage $V_b$ a high level, the second inverter 202 is inverted to render the high level output voltage $V_d$ a low level, and the third inverter 203 is inverted to render the low level output voltage $V_e$ a high level. As a result of inversion of the inverters 201, 202, 203, the voltage $V_a$ of the first condenser C is partly offset by the voltage of the second condenser 208 to be in a value $V_1$ lower than the threshold voltage $V_{TH}$. Then, the differential current flows through the oscillator circuit with the time period defined by the first and second condensers C and 208 and the resistor 205, and subsequently the voltage $V_a$ of the first condenser C reaches the threshold voltage $V_{TH}$ at time $t = t_2$. At this stage, the output voltage $V_d$ of the second inverter 202 is maintained at the low level.

When the voltage $V_a$ reaches the threshold voltage $V_{TH}$ with lapse of time from $t_0$ to $t_2$, the output voltage $V_d$ is inverted to a high level to render the voltage $V_a$ the initial level $V_0$ lower than DC voltage $V_{DD}$ in the same manner as described above. Thereafter, the above operation is repeated to conduct oscillation in the oscillator circuit 200 with the time period $(t_2 - t_0)$.

When the liquid level is in its minimum value $X_1$, the electro-static capacitance of the first condenser C is smaller than the capacitance $C_4$ of the second condenser 208. Assuming that at the minimum liquid level, the output voltage $V_b$ of the first inverter 201 is at a low level, the output voltage $V_d$ of the second inverter 202 is at a high level, and the output voltage $V_e$ of the third inverter 203 is at a low level, the first and second condensers C and 208 are biased opposite to each other due to input and output voltages of the third inverter 203. As a result, the voltage $V_a$ of the first condenser C is offset by the voltage of the second condenser 208 to be slightly higher than the threshold voltage $V_{TH}$. Then, the inverters 201, 202, 203 are inverted opposite to each other with a time delay defined by inherent propagation-time-delay characteristics thereof. In response to inversion of the inverters 201, 202, 203, the first and second condensers C and 208 are biased opposite to each other, and the voltage $V_a$ of the first condenser C is offset by the voltage of the second condenser 208 to be slightly lower than the threshold voltage $V_{TH}$. Thereafter, the inverters 201, 202, 203 are inverted opposite to each other to render the output voltage $V_b$ a low level, to render the output voltage $V_d$ a high level and to render the output voltage $V_e$ a low level. Consequently, the oscillator circuit 200 oscillates at a very high frequency corresponding with a short time period defined by the inherent propagation-time-delay characteristics of the respective inverters 201, 202, and 203.

From the above description, it will be understood that the oscillatorion frequency of the oscillator circuit 200 is determined by the capacitance of the second condenser 208 in relation to the electro-static capacitance of the first condenser C which changes in accordance with variation of the remaining quantity of the liquid stored within the container. It is also noted that the reverse bias degree of the first condenser C can be adjusted by change of the capacitance of the condenser 207. This serves to appropriately adjust the width of oscillation frequency of the oscillator circuit 200 in accordance with the distance between the maximum and minimum levels $X_3$ and $X_1$ in the container.

As a result of tests of the embodiment, it has been confirmed that in use of insulating liquid with dielectric constant $\epsilon = 2$, the oscillation frequency appearing at the output terminal 22 of the oscillator circuit 200 changes in a range between 50 kHz and 500 kHz in accordance with variation of the liquid level.

Although in the above embodiment, the condenser 207 is connected to the output terminal of the second inverter 202 for adjustment of the oscillation frequency of the circuit 200, the condenser 207 may be eliminated. In the case that the electro-static capacitance $C_4$ of the second condenser 208 is determined to be substantially equal to the electro-static capacitance $C_2$ of the variable condenser 206 at the medium level of the stored liquid, the oscillation frequency of the circuit 200 becomes wider in its width, as described above. Furthermore, the variable condenser 206 may be connected to the output terminal of the third inverter 203 if desired.

While the present invention has been described and illustrated in relation to a specific embodiment, it should be understood that the novel characteristics of the invention may be incorporated in other forms without departing from the spirit and scope of the invention as defined in the following claims.

What is claimed is:

1. An electric liquid level detector for detecting a level of liquid within a container, comprising:
   a pair of helically coiled electrodes extending vertically in said container and being fixed at their one ends to an upper portion of said container and at their other ends to a bottom of said container, said electrodes being positioned such that they are at least partially submerged by any liquid stored within said container and such that the amount of submersion is a function of liquid level within the container; and
   an oscillator circuit of the resistance capacity type including a variable condenser which is formed at least in part by said electrodes, said oscillator circuit being arranged to oscillate at a frequency that is a function of capacitance between said electrodes so as to indicate the level of the stored liquid,
   said oscillator circuit comprising;
      a first inverter connected to an electric DC power source;
      a second inverter connected to said electric DC power source and having an input terminal connected to an output terminal of said first inverter;
      a resistor connected in series with said first inverter to form a closed circuit, said variable condenser being connected at one end thereof with an output terminal of said second inverter and at the other end thereof with the output terminal of said first inverter through said resistor such that said first and second inverters are inverted opposite to each other with a time period defined by a resistance value of said resistor and an electrostatic capacitance of said variable condenser;
      a third inverter connected to said electric DC power source and connected at its input terminal to the output terminal of said second inverter; and
      a second condenser connected at one end thereof with an output terminal of said third inverter and at the other end thereof with the output terminal of said second inverter through said variable condenser such that said second condenser is biased by an inverter function of said third inverter in voltage polarity opposite to that of said variable condenser.

2. An electric liquid level detector as claimed in claim 1, wherein said oscillator circuit further comprises a third condenser connected in parallel with said variable condenser.

3. An electric liquid level detector as claimed in claim 1, wherein each of said electrodes is made of a conductive wire the diameter of which is determined to prevent vibration of said electrodes caused by a swing of the liquid within said container and to prevent deformation caused by its weight.

4. An electric liquid level detector as claimed in claim 1, wherein each of said electrodes is made of an enamelled copper wire the diameter of which is determined to prevent vibration of said electrodes caused by a swing of the liquid within said container and to prevent deformation caused by its weight.

* * * * *